United States Patent [19]
Sullivan et al.

[11] Patent Number: 6,045,914
[45] Date of Patent: *Apr. 4, 2000

[54] PEARLESCENT GLASS PIGMENT

[75] Inventors: William J. Sullivan, Ossining; Patricia Elliot, Irvington; Dana Fleming, Hyde Park, all of N.Y.

[73] Assignee: Engelhard Corporation, Iselin, N.J.

[ * ] Notice: This patent is subject to a terminal disclaimer.

[21] Appl. No.: 08/867,589

[22] Filed: Jun. 2, 1997

Related U.S. Application Data

[63] Continuation-in-part of application No. 08/657,311, Jun. 3, 1996, Pat. No. 5,753,371.

[51] Int. Cl.[7] .......................... B32B 17/00; B32B 17/06; B32B 18/00
[52] U.S. Cl. .......................... 428/404; 428/402; 428/403; 428/406; 106/415; 106/436; 106/437; 106/456; 106/482; 106/489; 427/214; 427/215; 427/372.2; 427/419.1; 427/419.2; 427/419.3
[58] Field of Search .................................. 428/406, 402, 428/403, 404, 415; 106/436, 437, 456, 482, 489; 427/214, 215, 372.2, 419.1, 419.2, 419.3

[56] References Cited

U.S. PATENT DOCUMENTS

| | | | |
|---|---|---|---|
| 3,331,699 | 7/1967 | Marshall et al. | 106/291 |
| 4,038,099 | 7/1977 | Deluca, Jr. et al. | 106/291 |
| 4,086,100 | 4/1978 | Esselborn et al. | 106/291 |
| 4,552,593 | 11/1985 | Ostertag | 106/291 |
| 4,735,869 | 4/1988 | Morita | 428/702 |
| 4,755,229 | 7/1988 | Armanini | 106/413 |
| 5,433,779 | 7/1995 | Deluca, Jr. | 106/418 |
| 5,436,077 | 7/1995 | Matsuba et al. | 428/404 |
| 5,626,661 | 5/1997 | Schmid et al. | 406/415 |
| 5,783,371 | 5/1998 | Sullivan et al. | 428/406 |

OTHER PUBLICATIONS

Derwent Publications Ltd., XP002039404, "Flake Pigment Composition with Good Ultraviolet Radiation–Discoloration Resistance Obtained by Covering Base of Inorganic Flake Covered by Titanium Oxide or Titanium Di:oxide and Metal (HYdr)Oxide with Cerium or Antimony (Hydr)Oxide".

Derwent Publications Ltd., XP002039405, "Preparation of Flake Substances Coated with Titania or Zirconia for Pearl Gloss Pigment Production by Dipping Flake in Solution Containing Hydrolysable and Poly:Condensable Organo-:Metallic Compounds Containing Titanium or Zirconium".

Derwent Publications Ltd., XP002039406, "Pearl Gloss Pigments Used as Fillers or Paint Pigments Consist of Flake Substrate Coated with Titania and/or Zirconium".

Derwent Publications Ltd., XP002039407, "Preparation of Pearl Pigment by Coating Flaky Substrate with Titania, Zirconia and then Heat Treating".

Derwent Publications Ltd., XP002039408, "Anticorrosive Coating Composition for Steel Plates Contains Glass Flakes Surface Treated with Phosphoric Acid".

*Primary Examiner*—Vivian Chen
*Attorney, Agent, or Firm*—Ostrolenk, Faber, Gerb & Soffen, LLP

[57] ABSTRACT

A pearlescent pigment comprises C glass flakes having a first layer comprising rutile titanium dioxide or iron oxide thereon and a second layer comprising hydrous oxide or hydroxide of a polyvalent cation, precipitate of said polyvalent cation, and an anionic polymeric compound. A hydrous layer of the rutile forming titanium dioxide or iron oxide is first formed on the glass flakes and the resulting coated flakes are calcined prior to the application of the second layer.

8 Claims, No Drawings

PEARLESCENT GLASS PIGMENT

This is a continuation-in-part of application Ser. No. 08/657,311, filed on Jun. 3, 1996 and now U.S. Pat. No. 5,753,371.

BACKGROUND OF THE INVENTION

Imparting a pearlescent luster, metallic luster and/or multi-color effects approaching iridescent can be achieved using a nacreous or pearlescent pigment which comprises a metal oxide-coated platelet. These pigments were first described in U.S. Pat. Nos. 3,087,828 and 3,087,829 and a description of their properties can be found in the Pigment Handbook, Vol. I, Second Edition, pp. 829–858, John Wiley & Sons, N.Y. 1988.

The oxide coating is in the form of a thin film deposited on the surfaces of the platelet. The oxide in most wide spread use at present is titanium dioxide. The next most prevalent is iron oxide while other usable oxides include tin, chromium and zirconium oxides as well as mixtures or combinations of oxides.

The coating of the metal oxide on the platelet must be smooth and uniform in order to achieve the optimum pearlescent appearance. If an irregular surface is formed, light scattering occurs, and the coated platelet will no longer function as a pearlescent pigment. The metal oxide coating must also adhere strongly to the platelet or else the coating will be separated during processing, resulting in considerable breakage and loss of luster.

During the preparation of these coatings on the platelets, particles which are not attached to the platelet may form. These small particles cause light scattering and impart opacity to the pigment. If too many small particles are present, the pearlescent appearance may be reduced or lost. The addition of these metal oxide coatings to a platelet so that the luster, color and color homogeneity are maintained is a very complex process, and to date, the only platy substrate which has achieved any significant use in commerce is mica.

A wide variety of other platy materials have been proposed for use as a substrate for forming these pearlescent pigments. These include non-soluble inorganic materials such as glass, enamel, china clay, porcelain, natural stones or other silicaceous substances, metal objects and surfaces of organic polymer materials such as polycarbonate. See, e.g., U.S. Pat. Nos. 3,123,485, 3,219,734, 3,616,100, 3,444,987, 4,552,593 and 4,735,869. While glass has been mentioned as a possibility on many occasions, for instance in U.S. Pat. No. 3,331,699, commercial pearlescent products are not made using glass and experience has shown that products made using glass as the platelet substrate have rather poor quality.

Said U.S. Pat. No. 3,331,699 discloses that glass flakes may be coated with a translucent layer of particles of a metal oxide having a high index of refraction, such as titanium dioxide, provided there is first deposited on the glass flakes a nucleating substance which is insoluble in the acidic solution from which the translucent layer of metal oxide is deposited. The patent does not mention the necessity of a smooth transparent film, not particles, being necessary for quality interference pigments to be developed. The patent teaches that the nature of the glass is not critical, but that the presence of the nucleated surface is critical. It is further stated that there are only a small number of metal oxide compounds which are insoluble in the acidic solution and capable of forming a nucleated surface on the glass flakes; tin oxide and a fibrous boehmite form of alumina monohydrate are the only two such materials disclosed. As demonstrated in the examples below, products prepared according to the teachings of this patent are poor in quality.

U.S. Pat. No. 5,436,077 teaches a glass flake substrate which has a metal covering layer on which is formed a dense protective covering layer of a metal oxide such as a titanium dioxide. In this patent, the nature of the glass is unimportant, the metallic coating provides the desired appearance and the overcoating of the metal oxide is present to protect the metallic layer from corrosive environments.

It has now been determined that there is a method for preparing smooth, uniform coatings of metal oxides on glass flakes which adhere to the glass flakes to yield high quality pearlescent pigments and it is accordingly the object of the present invention to provide such a method and to provide such metal oxide coated glass flake pearlescent pigments which result from that method. It is also possible to make combination pigments containing absorption pigments which are not soluble in water and which cannot be formed in place from a water-soluble reactant or reactants.

SUMMARY OF THE INVENTION

The present invention relates to a pearlescent pigment and to a method for the production of such a pigment. The resulting pigment can be used in any application for which pearlescent pigments have been heretofore used such as, for example, in cosmetics, plastics, inks and coatings including solvent or waterborne automotive paint systems.

DESCRIPTION OF THE INVENTION

In accordance with the present invention, a pearlescent pigment is formed by establishing a hydrous film layer of titanium and/or iron oxides on glass flakes and thereafter calcining the coated flakes provided that the glass flakes employed are C glass flakes and when the hydrous layer is titanium, the procedure is a rutilizing procedure.

Glass flakes are desirable in the industry because they are very resilient and can be optically attractive as well. The glass is primarily composed of $SiO_2$ and $Al_2O_3$ and can also include ZnO, CaO, $B_2O_3$, $Na_2O$ and $K_2O$ as well as FeO and $Fe_2O_3$. The glass flakes are made by stretching a molten glass into thin sheets, beads or glass tubes followed by crushing the glass into flakes. Large hollow spheres can be produced followed by solidification and crushing as well as a variety of other flake production methods. The flakes have a size and shape mimicking the mica platelets used in the $TiO_2$ and $Fe_2O_3$-coated mica pearlescent pigments and thus have an average particle size in the range of about 1 to 250 microns and a thickness of about 0.1–10 microns. More cubic flakes having similar particle sizes and thickness of about 10–100 microns can be utilized, however, the pearlescent effect is significantly diminished due to the low aspect ratio.

Glass can be classified as A glass, C glass or E glass. The A glass is a soda-lime glass and is commonly used to make windows. It contains more sodium than potassium and also contains calcium oxide. C glass, also known as chemical glass, is a form of glass which is resistant to corrosion by acid and moisture. It often contains zinc oxide as well as other oxides which makes the flakes more resistant to chemical destruction. E glass or electrical glass is, as the name implies, designed for electronic applications and although it is very stable at high temperatures, it can be susceptible to chemical attack. The following table shows the composition of several commercial samples of A, C and E glasses in weight percent. It is recognized that C glass as well as A and E glass have broad windows regarding their chemical composition and in fact A and E glass compositions can be made very similar to C glass.

TABLE 1

| Type | A Glass | C Glass | C Glass | E Glass | E Glass |
|---|---|---|---|---|---|
| $SiO_2$ | 72.5 | 65–70 | 65% | 52–56 | 52.5 |
| $Al_2O_3$ | 0.4 | 2–6 | 4% | 12–16 | 14.5 |
| CaO | 9.8 | 4–9 | 14% | 20–25 | 22.5 |
| MgO | 3.3 | 0–5 | 3% | 0–5 | 1.2 |
| $B_2O_3$ | 0.0 | 2–7 | 5.5% | 5–10 | 8.6 |
| $Na_2O + K_2O$ | 5.8 | 9–13 | 8.5% | <0.8 | <0.5 |
| ZnO | — | 1–6 | 0 | — | — |
| $FeO/Fe_2O_3$ | 0.2 | — | 0 | — | 0.2 |

In the practice of the present invention, the C or chemical type glass is preferred. While metal oxide coatings an A or E glass can be prepared, the resulting pigments do not have the quality of the products as C glass and hence have limited commercial value. When $TiO_2$ coated products are prepared, anatase or rutile crystal modifications are possible. The highest quality and most stable pearlescent pigments are obtained when the $TiO_2$ is in the rutile form. Also the glass used can influence the crystal form of the titanium dioxide coating. For instance, when common E glass is used, the resulting crystal phase is primarily anatase. In order to obtain rutile, an additive must be used which can direct the $TiO_2$ to the rutile modification.

The coating of the glass flakes with titanium dioxide or iron oxide generally follows procedures known in the art for the formation of $TiO_2$-coated or iron oxide-coated mica. Mica is anatase directing and, as noted earlier, most glass also appears to direct titanium dioxide coatings to the anatase crystalline form. At least some rutile formation is necessary to obtain higher quality and more stable products.

In general, the procedure involves the dispersing of the glass flake particulate and combining that dispersion with a precursor which forms a hydrous titanium oxide or iron oxide film coating on the flakes.

In the coating process, the glass flakes are dispersed in water, which is preferably distilled. The average particle size which is preferably used can vary from an average of about 3 microns to an average of about 150 microns and a flake thickness of 0.1–25 microns although larger flakes can also be used if so desired. The concentration of the glass flake in water can vary from about 5% to 30% although the generally preferred concentration varies between about 10% to 20%.

After the glass is dispersed in the water and placed in an appropriate vessel, the appropriate titanium or iron source materials are introduced. The pH of the resulting dispersion is maintained at an appropriate level during the addition of the titanium or iron by use of a suitable base such as sodium hydroxide to cause precipitation of the hydrous titanium dioxide or hydrous iron oxide on the glass flakes. An aqueous acid such as hydrochloric acid can be used for adjusting the pH. The coated platelets can, if desired, be washed and dried before being calcined to the final pearlescent pigment.

The source of the iron is preferably ferric chloride although any other iron source known in the prior art can be employed. The source of the titanium is preferably titanium tetrachloride although, similarly, other sources known in the art can be employed. If desired, layers of titanium and iron can be deposited sequentially.

In the case of titanium dioxide, the modifications of the foregoing procedure to realize a rutilization procedure are known in the prior art. In one procedure, a layer of hydrous tin oxide is first precipitated on the surface of the glass flakes followed by the layer of hydrous titanium dioxide. When this layered combination is processed and calcined, the titanium dioxide is oriented in the rutile form. The procedure is described in detail in U.S. Pat. No. 4,038,099, which is incorporated herein by reference. An alternate procedure involves the deposition of the hydrous titanium dioxide on the glass flakes in the presence of iron and calcium, magnesium and/or zinc ions without the use of tin. This is described in detail in U.S. Pat. No. 5,433,779, the disclosure of which is hereby incorporated by reference.

Combination pigments can be made as described in U.S. Pat. No. 4,755,229, the disclosure of which is incorporated herein by reference. Briefly, an aqueous dispersion of the colored pigment containing an anionic polymeric substance is added to a suspension of the pigment. The hydrous oxide of a polyvalent metal is then produced by the simultaneous addition of a solution of the metal salt and of a basic solution. The dispersed pigment particles and the polymer deposit with the hydrous oxide of the polyvalent metal to form a smooth, adherent, uniform coating on the pearlescent glass.

In order to utilize an insoluble absorption pigment successfully in combination pigments, the insoluble pigment must be very highly dispersed. A convenient starting point is the dry pigment or preferably an aqueous presscake of the pigment. After dilution with water or other liquid, such as alcohol, dispersion is achieved by any one of the usual techniques, such as milling, high shear mixing, or application of ultrasonic energy. The desired degree of dispersion is similar to that conventionally used in paint and coating formulations. It is preferred to add the anionic polymer prior to or during the dispersion step in order to assist the dispersion process.

The polymer-absorption pigment dispersion is combined with a suspension of coated glass pigment. The pH of the resulting suspension should be in the range suitable for precipitation of the desired polyvalent cation hydroxide or hydrous oxide, generally between about pH 1 and 11, and most frequently between about pH 2 and 8. A solution of soluble salt of the polyvalent cation is then added to the suspension simultaneously with a quantity of a basic material soluble in the solution sufficient to maintain the pH in the desired precipitation range. The absorption pigment is deposited on the platelets to form a smooth, uniform, colored coating. The suspension can then be filtered, and the filter cake washed with water and dried, for example, at 120° C., to produce an easily dispersible powder of the combination pigment.

Absorption pigments which are water insoluble, transparent (i.e. substantially non-light scattering) and which cannot be formed in situ from a water soluble reactant(s) but which may be highly dispersed in water or water-alcohol containing anionic polymer are suitable for the invention. These include, for example, carbon black and organic pigments in the following groups: azo compounds, anthraquinones, perinones, perylenes, quinacridones, thioindigos, dioxazines, and phthalocyanines and their metal complexes. The pigments, depending on their color intensity, are used in a concentration range of about 0.01% to about 30% based on the weight of pigment, preferably 0.1% to 10%.

The useful polymers are those which are capable of precipitating with polyvalent cations at the appropriate pH values. Thus, the polymers are usually anionic, or, like proteins, have both anionic and cationic groups. Useful polymers include albumin, gelatin, polyacrylamides, polyacrylic acids, polystyrene sulfonates, polyvinyl phosphonates, sodium carboxymethyl cellulose and polysaccharides such as xanthan gum, alginates, and carageenin. The polymer content is from about 0.01% to about 20%, preferably from 0.05 to 10%, based on the weight of the mica pigment.

Any polyvalent cation which will form a precipitate with the polymer under given pH conditions can be used. Such polyvalent cations are employed in the form of a solution of a soluble salt. Thus, the cation can be, for example, one or more of Al(III), Cr(III), Zn(II), Mg(II), Ti(IV), Zr(IV), Fe(II), Fe(III), and Sn(IV). Suitable anions include chloride, nitrate, sulfate, and the like. The quantity of polyvalent metal ion is from about 0.01% to about 20%, preferably about 0.05% to about 10%, of the weight of the mica pigment.

The preferred pH range for deposition depends on the particular cation being employed. For Al and Cr(III), it is about 4.0 to 8.0. For Zr(IV), it is about 1.0 to 4.0. The metal salt solution is usually acidic, and the pH of the suspension is maintained at the desired range by addition of a soluble base, such as sodium hydroxide, potassium hydroxide, or ammonia solution. Where the desired pH of precipitation is lower than that of the salt solution, a soluble acid, such as HCl, is added as required.

The effect in each case is to deposit on the pigment platelets a complex of metal hydroxide or hydrous oxide and polymer which carries the particles of the absorption pigment with it, to produce a combination pigment with a smooth, adherent colored film on the platelets. After the deposition, the film can be fixed by washing and drying the combination pigment.

Colors may be adjusted if desired by mixing combination pigments. In general, it is preferred to mix pigments of the same or similar reflection color, since reflection colors mix additively and color intensity is reduced when very different reflection colors are mixed. The absorption pigment components mix subtractively, and the usual pigment blending procedures are followed.

In order to further illustrate the invention, various non-limiting examples are set forth below. In these, as well as throughout the balance of this specification and claims, all parts and percentages are by weight and all temperatures are in degrees centigrade unless otherwise indicated.

EXAMPLES 1–4

A coating procedure was adopted in which 100 grams of C glass flakes (RCF-140 from Nippon Sheet Glass) having an average particle size of about 140 microns (by laser light scattering) were dispersed in 750 ml of water. Iron and zinc were introduced in the form of 1 ml of a 39% aqueous solution of ferric chloride and 7 ml of a 9% aqueous zinc chloride solution. The pH of the slurry was adjusted to 3.0 using a 35% aqueous sodium hydroxide solution and the slurry heated to a temperature of 76° C. The pH was then lowered to 1.6 by addition of hydrochloric acid and a 40% aqueous solution of titanium tetrachloride was added at a rate of 100 ml/hour while the pH was maintained at 1.6 by the addition of 35% aqueous sodium hydroxide. The titanium introduction was continued until an appearance of either a white pearl or the interference colors gold, red and blue had been reached. When the desired end point was achieved, the slurry was filtered on a Buchner funnel and washed with additional water. The coated platelets were then dried and calcined at 600° C.

Microscopy evaluation of the resulting pigment confirmed that the platelets are coated with a smooth homogeneous film layer of $TiO_2$.

In addition, the luster and color of the resulting pigments were evaluated visually and instrumentally using drawdowns on a hiding chart (Form 2–6 Opacity Charts of The Leneta Company), half of which is black and half of which is white. A coating on the black part of this chart displays the reflection color and luster when it is examined specularly, while the coating on the white portion displays the transmission color when it is viewed at non specular angles. The drawdowns were prepared by incorporating 12% pigment in a nitrocellulose lacquer and applying this suspension to the black and white chart with a Bird film applicator bar.

When these cards were examined visually, pearlescent pigments with good luster and color intensity were observed. The appearance characteristics of these pigments were further characterized by determining the wavelength at which the reflectivity is a maximum and a minimum and the color described in terms of $L^*a^*b^*$. The $L^*a^*b^*$ data characterizes the appearance of a product in terms of its lightness-darkness component symbolized by $L^*$, a red-green component represented by $a^*$ and a yellow-blue component symbolized by $b^*$. These measurements were made by using a goniospectrophotometer (GK-111 from Datacolor, Inc.).

Besides the appearance measurements, three of the pigments were also analyzed for the percentage of rutile and anatase that was present in each sample by x-ray diffraction. These results are all summarized in Table 2.

TABLE 2

| | | | | | GK-111 12% Black 45/0 | | |
| --- | --- | --- | --- | --- | --- | --- | --- |
| Example | COLOR | λmax | λmin | Crystal Form | $L^*$ | $a^*$ | $b^*$ |
| 2 | Gold | 570 | 700 | Rutile | 88.64 | 6.73 | 1.68 |
| 3 | Red | 630 | 540 | Rutile | 89.25 | 17.52 | −5.78 |
| 4 | Blue | 670 | 570 | Rutile | 85.03 | −3.32 | −3.95 |

In all cases, a high-quality, high-luster rutile titanium dioxide-coated glass flake pearlescent pigment was obtained.

EXAMPLE 5–11

One hundred grams of C glass flakes having an average particle size of 140 μm (RCF-140 from Nippon Sheet Glass) were dispersed in 333 ml of distilled water. This dispersion was heated to 74° C., and the pH adjusted to 1.6 using dilute hydrochloric acid. Then 7 ml of an 18% stannous chloride solution were slowly added. After the addition of the tin, a 40% aqueous solution of titanium tetrachloride was added at a rate of 100 ml/hr. The pH was maintained at 1.6 during the addition of the tin and titania by simultaneously adding a dilute aqueous solution of sodium hydroxide. The titania addition was continued until either a white pearl, interference colored gold, red, blue or green were observed. When the desired end point was reached, the slurry was filtered, washed with additional water and calcined at 600° C.

The resulting products were examined microscopically to verify that the $TiO_2$ was attached to the glass flakes in the form of a smooth homogeneous film layer. When drawn down, a series of vibrant, high quality colors were observed.

The color data and X-ray diffraction results for these products are summarized in Table 3. A high quality, high luster, rutile titanium dioxide coated glass flake pearlescent pigment was obtained in each case.

TABLE 3

| Example | Color | λmax. (nm) | λmin. (nm) | Crystal Form | GK-111 Results L* | a* | b* |
|---|---|---|---|---|---|---|---|
| 5 | Pearl | 400 | 700 | Rutile | 73.55 | −1.28 | −2.59 |
| 6 | Gold | 630 | 700 | Rutile | 61.17 | 0.69 | 13.05 |
| 7 | Orange | 670 | 470 | Rutile | 59.75 | 8.00 | 10.27 |
| 8 | Red | 700 | 490 | Rutile | 60.47 | 8.95 | 2.85 |
| 9 | Violet | 400 | 520 | Rutile | 61.37 | 12.04 | −8.86 |
| 10 | Blue | 440 | 580 | Rutile | 69.09 | 0.96 | −9.95 |
| 11 | Green | 500 | 670 | Rutile | 60.06 | −9.44 | 0.41 |

EXAMPLES 12–20

75 grams of C-glass flakes having an average size of 100 μm were dispersed in 300 ml of distilled water. The dispersion was heated to 76° C. and the pH adjusted to 3.2 with dilute hydrochloric acid. A ferric chloride solution was added to the suspension at 0.2 ml/min while maintaining the pH at 3.2 using dilute sodium hydroxide. The ferric chloride addition was continued until the desired color was observed. At the appropriate end point, the slurry was filtered, washed with water and calcined at 600° C. to yield an $Fe_2O_3$ coated glass flakes.

The resulting products were examined microscopically verifying that the $Fe_2O_3$ is attached to the glass flakes as a smooth, homogeneous film coating.

Since $Fe_2O_3$ has an inherent red color, glass flakes coated with this oxide have both a reflection color and an absorption color. The interference color is from the interference of light, while the absorption color is due to the absorption of light. The reflection color will change from gold to red to blue to green as increasing amounts of iron (III) oxide are coated on the glass flakes. As more iron (III) oxide is added, even thicker coatings of $Fe_2O_3$ are obtained which yield another series of interference colors known as the second order observable interference colors. These second order colors have even higher color intensity than the first colors along with higher coverage. If the coating process is continued even further, a third series of interference colors can be obtained.

When these iron oxide coated glass flakes were drawn down, a series of vivid, high quality colors were observed. Color data from these drawdowns was obtained and is summarized in Table 4.

TABLE 4

| Example | MI 39% FeCl₃ | Interference Color | λmax. (nm) | λmin. (nm) | L* | a* | b* |
|---|---|---|---|---|---|---|---|
| 12 | 48 | 1st Orange | 665 | 400 | 75.64 | 13.50 | 21.63 |
| 13 | 66 | 1st Red | 700 | 540 | 64.49 | 10.72 | 2.36 |
| 14 | 78 | 1st Violet-Blue | 700 | 600 | 66.03 | −2.66 | 0.35 |
| 15 | 90 | 1st Green | 570 | 660 | 70.69 | −5.34 | 8.28 |
| 16 | 102 | 2nd Orange | 583 | 400 | 72.02 | 1.33 | 14.30 |
| 17 | 126 | 2nd Red | 620 | 400 | 61.06 | 7.86 | 6.14 |
| 18 | 138 | 2nd Violet-Blue | 590 | 400 | 56.17 | 3.48 | 2.35 |
| 19 | 150 | 2nd Green | 700 | 400 | 54.24 | −0.31 | 2.08 |
| 20 | 174 | 3rd Orange | 590 | 400 | 51.46 | 1.48 | 2.67 |

EXAMPLES 21–23

The $TiO_2$ coatings also produce a series of interference colors as the thickness of the $TiO_2$ layer on the glass increases. Thin $TiO_2$ coatings produce a whitish reflection which appears pearly or silver. As with $TiO_2$ coating layer becomes thicker, gold, red, blue and green interference colors are observed. As the coating becomes even thicker, a series of second observable color is observed. These second colors have more color intensity and hiding than the first colors described in the Examples above.

These second colors were prepared by dispersing 50 gm of the glass flakes used in Examples 1–11 in 333 ml of distilled water. The pH was adjusted to 1.6 with dillute HCl, and the suspension was heated to 74° C. 7 ml of 18% stannous chloride were added followed by the addition of 40% titanium chloride at a rate of 0.33 ml/min. The pH was maintained at 1.6 by simultaneously adding dilute sodium hydroxide. The titania addition was continued until the desired second observable color was observed. The slurry was filtered, washed with water and the resulting presscake calcined at 600° C. to yield a $TiO_2$ coated glass flakes.

When drawn down, the resulting products have higher color intensity and more coverage than their comparable first observable interference colors. Color data from these drawdowns is summarized in Table 5.

TABLE 5

| Example | Second Observable Interference Color | λmax. (nm) | λmin. (nm) | TiO₂ Crystal Form | GK-111 Data L* | a* | b* |
|---|---|---|---|---|---|---|---|
| 21 | Gold | 580 | 430 | Rutile | 67.89 | −3.54 | 10.88 |
| 22 | Orange | 640 | 480 | Rutile | 65.14 | 6.13 | 8.98 |
| 23 | Red | 680 | 510 | Rutile | 63.26 | 7.96 | 1.02 |

EXAMPLES 24–28

For comparative purposes, several examples of the aforementioned U.S. Pat. No. 3,331,699 were repeated.

In the first instance, examples 1 and 2 of the patent in which glass was treated first with tin and then with titanyl sulfate were reproduced using E glass (REF-140 from Nippon Sheet Glass). The resulting products were examined using an optical microscope. The coatings were not smooth, and very little of the $TiO_2$ was actually attached to the surface of the glass flakes. When drawn down on the black and white cards, the resulting products had low luster, and exhibited no real interference effect. The patent's example 1 states that if a small portion of a dried sample was re-slurried in water, it would exhibit a lustrous sparkle. Accordingly, small quantities of the samples were redispersed in distilled water. The reproduced sample from example 1 exhibited nothing except a milky suspension while the sample from Example 2 displayed a pale purple colored flake. The reproduced product of example 1 was calcined and a mixture of anatase and rutile titanium dioxide was observed, but the product quality was poor.

Example 6 of the 3,331,699 Patent was also reproduced twice and resulted in a sequence of interference color pigments. In one reproduction, the glass flake was a C glass (RCF-140 of Nippon Sheet Glass) and in the other reproduction it was E glass (REF-140 of Nippon Sheet Glass). When the pigments produced in these two examples were examined microscopically, some of the flakes were uncoated, and for those flakes that were coated, the coatings were rough, contained many cracks and in some cases the coatings were peeling away from the surface of the glass. The pigments produced on the C glass were superior to their counterparts produced on the E glass. The C glass products were approximately 30% rutile and 70% anatase while the E glass products were almost exclusively anatase.

Example 12 of the 3,331,699 patent, in which glass flakes were treated with tin and then with iron, was repeated using E glass (REF-140 of Nippon Sheet Glass). The resulting product was a rust colored powder that exhibited primarily an absorption color effect. When a drawdown was prepared, the product exhibited very low luster and reflectivity. The products prepared in Examples 12–20 above were vastly superior.

EXAMPLES 29–30

The procedure of Example 5–11 was repeated except that an E glass was substituted for the C glass. The $TiO_2$ coating was made which had a white, pearly appearance. The resulting E glass product had a titanium dioxide coating which was primarily anatase while the C glass products had 100% rutile titanium dioxide coatings and were much higher product quality. The color data is presented in Table 6.

TABLE 6

| Example | Interference Color | λmax. (nm) | λmin. (nm) | Crystal Form | GK-111 12% Black 45/0 | | |
| --- | --- | --- | --- | --- | --- | --- | --- |
| | | | | | L* | a* | b* |
| 29 (C-Glass) | Pearl | 400 | 700 | Rutile | 73.64 | −0.94 | −2.36 |
| 30 (E-Glass) | Pearl | 400 | 700 | Anatase | 73.44 | −0.55 | 0.21 |

EXAMPLE 31

An aqueous presscake of quinacridone red (Sunfast Red 19, Sun Chemical Co., 23.7% pigment) is diluted to 0.50% pigment with water. To 250 g of this suspension is added 0.1 g xanthan gum (Kelzan, a microbiolal polysaccharide containing a glucuronic acid, Kelco Division). Ultrasonic energy is applied by means of a Sonifiero® Model 350 (Branson Sonic Power Co.) for 30 minutes to disperse the pigment.

The pearlescent glass substrate is 50 g of blue-reflecting pigment of Example 4, suspended by stirring in 400 g of water. The pH value of the suspension is 9.0, and is adjusted to 6.0 with 0.1 N HCl. This suspension was combined with the quinacridone red dispersion. A solution of 2.64 g $CrCl_3.6H_2O$ in 165 g water is added at a uniform rate while maintaining the pH at 6.0 with 3.5% (by weight) NaOH. A smooth, uniform red coating is achieved. The suspension is filtered, and the filter cake is washed with water. The filter cake was dried at 120° C. for 1 hour.

Incorporated at 3% by weight in a paint vehicle of the following composition:

| | |
| --- | --- |
| Acrylic resin thermosetting 50% NV | 51.78 Parts |
| Melamine, 60% NV | 16.83 Parts |
| Solvent, xylene | 30.29 Parts | the combination pigment yields a two-color paint which, coated on a surface, has a blue highlight on a red background.

EXAMPLE 32

A charge of 50 grams of the blue reflecting pigment of Example 4 in 800 ml of water were stirred at 60° C. and the pH adjusted to 2 with a hydrochloric acid solution. A charge of about 64.7 grams of Sunfast blue colorant (7.5 g solids) were added and stirred for 30 minutes while adjusting the pH to 6 with 3.5% NaOH. Then a 2.4 aqueous solution of aluminum chloride hexahydrate was added at a rate of 1.5 ml/min and the pH maintained at 6 with the NaOH solution. The pH was raised to 7 and stirring continued for an additional 15 minutes. The product was recovered by filtering and the wet cake washed five times with 500 ml of water. It was then dried overnight at 90° C.

EXAMPLES 33–36

Example 32 was repeated four times employing Sunfast green colorant on a green colored rutile titanium dioxide coated glass (Example 33), Sunfast green colorant and the blue reflective pigment of Example 4 (Example 34), carbon black and a copper colored coated glass pigment (Example 35) and carbon black in a violet colored pearlescent glass (Example 36). All of the resulting products were very attractive.

Various changes and modifications could be made in the process and products of this invention without departing from the spirit and scope thereof. The various embodiments which have been disclosed herein were for the purpose of further illustrating the invention but were not intended to limit it.

What is claimed is:

1. A pearlescent pigment comprising flakes of C glass having a first coating comprising iron oxide or rutile titanium dioxide thereon, wherein the source material for said rutile titanium dioxide is selected from the group consisting of titanium tetrachloride and titanyl sulfate, and coated with a second layer comprising hydrous oxide or hydroxide of a polyvalent cation, precipitate of said polyvalent cation and an anionic polymeric substance, and water-insoluble colored pigment, the percentages of said cation, substance and pigment based on the weight of said pearlescent pigment being 0.01–20, 0.01–20, and 0.01–30, respectively.

2. The pearlescent pigment of claim 1, in which the first coating comprises rutile titanium dioxide.

3. The pearlescent pigment of claim 1, in which the first coating comprises iron oxide.

4. A method of forming a pearlescent pigment which comprises forming a first layer of hydrous rutile forming titanium dioxide or hydrous iron oxide on C glass flakes, calcining said layered flakes, forming an aqueous suspension of the calcined flakes, combining the aqueous suspension with an aqueous suspension of water-insoluble colored pigment containing an anionic polymeric substance, combining the resulting suspension with an aqueous acidic solution of a polyvalent cation which forms a hydrous oxide or hydroxide precipitate and a precipitate with said substance at a given pH and a quantity of a pH adjustment agent to provide said given pH, and recovering the resulting colored pigment.

5. A method according to claim 4, in which a first layer of hydrous rutile forming titanium dioxide is deposited.

6. A method according to claim 5, in which the first layer is formed by precipitating hydrous tin oxide on the surface of the glass flakes followed by depositing a layer of hydrous titanium dioxide thereon.

7. A method according to claim 4, in which the hydrous titanium dioxide is deposited on the glass flakes in the presence of iron and at least one member selected from the group consisting of calcium, magnesium and zinc ions.

8. A method according to claim 4, in which a first layer of hydrous iron oxide is deposited.

\* \* \* \* \*